March 16, 1948. A. C. WALL 2,437,772
ELECTRICAL HARNESS TESTER CIRCUIT
Filed Dec. 7, 1943
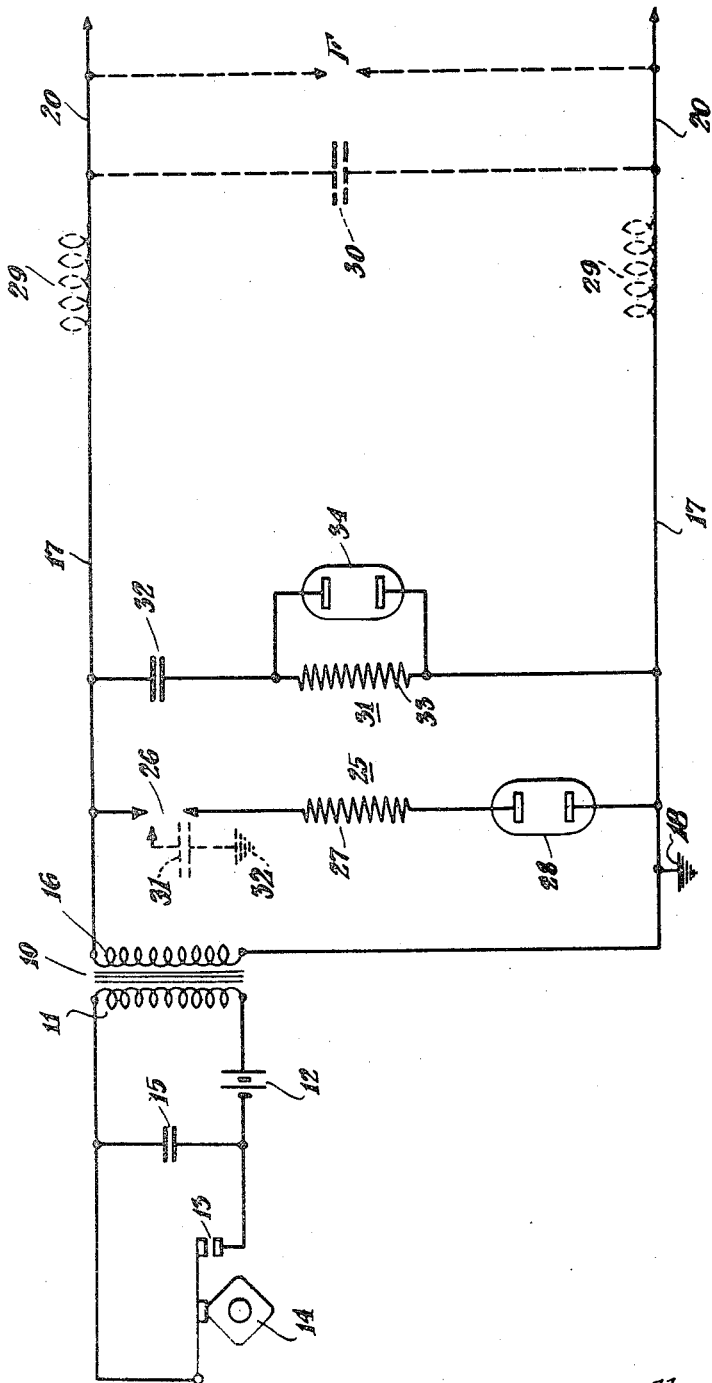
INVENTOR.
Alexander C. Wall
BY
Roblin + Carlson
ATTORNEYS Patented Mar. 16, 1948

2,437,772

UNITED STATES PATENT OFFICE 2,437,772

ELECTRICAL HARNESS TESTER CIRCUIT

Alexander C. Wall, Indianapolis, Ind., assignor to P. R. Mallory & Co., Inc., Indianapolis, Ind., a corporation of Delaware Application December 7, 1943, Serial No. 513,238

5 Claims. (Cl. 175—183)

This invention relates to an electrical testing apparatus and more particularly to an apparatus for testing high tension electric utilities such as aircraft engine ignition harnesses, spark plugs, magnetos or the like.

An object of the invention is to provide a simple, dependable and efficient apparatus of the above type which may be readily operated by unskilled persons.

Another object is to provide novel and improved apparatus of the above type suitable for field testing purposes.

Another object is to provide an apparatus of the above type which gives an indication of the nature and location of the fault.

Various other objects and advantages will be apparent as the nature of the invention is more fully disclosed.

A number of commercial devices are available for the purpose of testing high voltage leads such as in aircraft engine ignition harnesses. These devices have the serious drawback, however, of operating from commercial 60 cycle line voltage. The characteristics of this voltage may be widely different from the characteristics of the normal voltage applied to the circuit, such as for instance an aircraft engine magneto. It is one of the objects of this invention to provide a device which will apply to the circuit under test, a voltage which is practically identical with the voltage which is applied in service.

It is also a further object of this invention to control this voltage in such a way that owing to the limited amount of power in the source, the lead under test will not be irreparably damaged by the discharge through a correctable fault. For instance, the use of 60 cycle commercial frequency type of instruments may, when discharging across a moisture path, cause severe burning of the insulation, due to the large amount of power dissipated. In this device, however, such a moisture condition is indicated, and the power across the fault controlled, so that the moisture may be removed and the lead restored to normal operating condition.

The testing apparatus embodying the present invention includes a source of testing voltage which, in a field set, may comprise a battery and interrupter connected to a transformer, of the general type used for automobile ignition purposes, or may be powered by a hand operated magneto. The secondary of the transformer is connected to leads for supplying testing voltage to the line to be tested.

A low frequency shunt discharge path having a control gap to determine the breakdown voltage is connected across the leads. This path includes a resistance capable of damping out any high frequency currents produced by the discharge. An indicator, such as a glow lamp, is connected in this path to indicate the passage of current which corresponds to normal line conditions.

A high frequency shunt path including a condenser, forming a high pass filter, and a resistor is also connected across the leads. An indicator, such as a glow lamp, is connected across the resistor to be energized in accordance with the voltage drop produced therein. The characteristics of this shunt path are such that at the low frequencies produced by discharge across the control gap corresponding to normal line conditions, the voltage drop across the resistor is insufficient to energize the indicator. However, when a breakdown occurs at a fault in the line being tested, the inductance and capacity of the line to the fault and of the shunt path, form a high frequency circuit in which high frequency currents are produced by the discharge at the fault. These high frequency currents produce a voltage drop across the resistor sufficient to energize the indicator thereacross. The condition of the line is indicated by the nature of the flashing of the two glow lamps.

Although the novel features which are believed to be characteristic of this invention are pointed out more particularly in the claims appended hereto, the invention itself may be better understood by referring to the following description, taken in connection with the accompanying drawings in which a specific embodiment thereof has been set forth for purposes of illustration.

In the drawings, the figure is a diagrammatic representation of a testing apparatus embodying the present invention.

Certain specific terms are used herein for convenience in referring to various details of the invention. It is to be understood, however, that these terms are to be given an interpretation commensurate with the state of the art.

Referring to the drawings more in detail, the invention is shown as applied to a testing circuit comprising a transformer 10 having a primary 11 energized by a source of current, shown as a battery 12, through a circuit including an interrupter 13 actuated by a cam 14. A condenser 15 is shown as connected across the interrupter to reduce sparking.

The secondary 16 of the transformer 10 is connected to leads 17, one of which may be grounded as at 18, and the leads 17 are adapted to be connected across a line 20 to be tested. The transformer 10 and interrupter 13 may be of the general type used in automobile ignition circuits for producing a high tension voltage for spark plug circuits. It is to be understood, of course, that other sources of testing voltage for the leads 17 may be employed if available.

A low frequency discharge path 25 is connected across the leads 17. This path is shown as comprising a control gap 26, a resistor 27 and an indicating device 28, such as a neon lamp or other glow lamp. These elements are connected in series so that when a discharge takes place across the control gap 26 the lamp 28 is energized. The resistance 27 is designed to damp out any high frequency oscillations produced, by the discharge across the gap 26, in the circuit including the inductance and capacity of the line 20, indicated by the dotted inductances 29 and the dotted capacity 30.

A shunt path 31 is also provided across the leads 17. This path includes a high pass filter, indicated as a condenser 32, and a resistor 33. An indicator 34, shown as a glow lamp, is connected across the resistance 33.

The characteristics of the high pass filter are such that at low frequencies such as those produced by a discharge across the gap 26, the current passing through the resistor 33 does not produce a sufficient voltage drop to energize the lamp 34. When a breakdown occurs at a fault, indicated at F, across the line 20, the shunt path 31 with the capacity 30 and inductance 29 of the line 20 to the fault, forms a high frequency path in which high frequency currents are produced by the discharge at the fault F. These high frequency currents which may be of radio frequency are of sufficient intensity to produce a voltage drop across the resistor 33 suited to energize the lamp 34 and cause the same to flash. If the voltage at the fault F is less than the voltage across the gap 26, there will be no further discharge across the gap 26 and the lamp 28 will be de-energized.

The operation of the above circuit will be evident from the above description. The nature of the flashing of the lamp 34 and of the lamp 28 provides an indication of the nature and location of the fault F. Flashing of the lamp 28 only indicates the normal condition of the line 20 and no breakdown. Flashing of the lamp 34 only indicates breakdown at the fault F of lower voltage than the discharge voltage across the gap 26. Flashing of both lamps indicates a breakdown at the fault F of about the same voltage as the discharge voltage across the gap 26, and failure of either lamp to flash would indicate either a faulty testing circuit or a breakdown of such low voltage as to constitute substantially a short circuit across the line. The characteristics of the flashes of the lamp 34 provide an indication of the inductance and capacity of the line 20 to the fault, which is a measure of the location of the fault. The gap 26 may be adjusted in accordance with the breakdown voltage to be applied to the line 20 for testing. The discharge across the fault F will not draw sufficient energy to injure the materials under test and accordingly facilitates the location and correction of the fault.

The line 20 represents any utility to be tested, such as a high tension circuit, aircraft ignition harness, spark plug, magneto, or the like. In the case of a magneto the device indicates a miss in the regular sparking at a spark gap which corresponds to the discharge path F. A magneto should cause a spark to jump this gap at the rate of, for example, 300 times per second. During such operation the light 34 flashes with each spark at the magneto gap but when a miss or skip occurs the light 28 flashes. In this way a single miss out of 300 or more sparks per second is clearly indicated.

It will be evident from the above that an accurate indication of the nature and location of the fault may be obtained by unskilled persons by observation of the indicators 28 and 34. The entire equipment may be incorporated in a suitable unit for field operations. It is of course to be understood that other types of indicators may be used and that neon lamps have been indicated merely by way of illustration. These lamps may be replaced by other glow tubes, incandescent lamps, meters, or the like.

Although a specific embodiment of the invention has been set forth for purposes of illustration, it is to be understood that the invention is capable of various adaptations as will be readily apparent to a person skilled in the art. The invention is only to be limited in accordance with the scope of the following claims.

With respect to the third gap point of gap 26 as shown in the drawing, the purpose of this gap is to cause a slight spark before the main discharge takes place, thus producing a copious supply of ions in the immediate gap area, thus providing the necessary conditions for stable operation of the main spark gap. It will be understood that the third gap point has a small inherent capacity to ground as indicated by the dotted condenser 31 and ground connection 32. Responsive to this inherent capacity and to the close spacing of the third gap electrode to the adjacent gap point, a very slight discharge between these electrodes takes place just prior to the discharge across the main electrode. This slight discharge is effective to provide a supply of ions in the immediate gap area just before discharge of the main gap, thus assuring stable operation in the manner stated.

In the case of the magneto test, a gap very similar to 26 is placed at the location F and the high tension coil of the magneto is substituted in place of coil 16.

What is claimed is:

1. An electrical testing apparatus for testing the electrical characteristics of a utility having a breakdown path comprising leads to be connected to the utility to be tested, a source of alternating voltage connected across said leads to supply testing voltage thereto, a shunt discharge path connected across said leads having a gap adapted to break down and pass current when subjected to said testing voltage, said path having impedance characteristics to damp out any high frequency currents produced by the discharge across said gap, a high frequency shunt path connected across said leads having high pass filter means to discriminate against the low frequencies produced by said gap discharge, said high frequency shunt path cooperating with the breakdown path of said utility to form a high frequency circuit in which high frequency oscillations are produced by a discharge across said breakdown path, indicating means for showing passage of current in said shunt discharge path, and an indicator connected in said high frequency circuit, said indicator being operable when the current through said high frequency shunt path reaches a predetermined magnitude.

2. An electrical testing apparatus for testing the electrical characteristics of a utility having a breakdown path, comprising leads to be connected to the utility to be tested, a source of alternating voltage connected across said leads to supply testing voltage thereto, a shunt discharge path connected across said leads having a gap adapted to break down and pass current when subjected to said testing voltage, said shunt path having impedance characteristics to damp out any high frequency currents produced by the discharge across said gap, a high frequency shunt path connected across said leads, comprising a condenser and a resistor connected in series and an indicating device connected across the resistor, said condensor constituting a high pass filter having characteristics to discriminate against the frequencies produced by said discharge and co-operating with the breakdown path of said utility to form a high frequency circuit in which high frequency oscillations are produced by a discharge across said breakdown path, said indicating device being adapted to be energized by the voltage drop across said resistor produced by said high frequency oscillations.

3. An electrical testing apparatus for testing the electrical characteristics of a utility having a breakdown path, comprising leads to be connected to the utility to be tested, a source of alternating voltage connected across said leads to supply testing voltage thereto, a shunt discharge path connected across said leads having a gap adapted to break down and pass current when subjected to said testing voltage, and a resistor in series with said gap having characteristics to damp out any high frequency currents produced by the discharge across said gap, a high frequency shunt path connected across said leads having high pass filter means to discriminate against the low frequencies produced by said discharge, said shunt path cooperating with the breakdown path of said utility to form a high frequency circuit in which high frequency oscillations are produced by a discharge across said breakdown path, indicating means for showing passage of current in said shunt discharge path, and an indicator connected in said high frequency circuit, said indicator being operable when the current through said high frequency shunt path reaches a predetermined magnitude.

4. An electrical testing apparatus for testing the electrical characteristics of a utility having a breakdown path, comprising leads to be connected to the utility to be tested, a source of alternating voltage connected across said leads to supply testing voltage thereto, a discharge path connected across said leads having a gap adapted to break down and pass current when subjected to said testing voltage, said path having impedance characteristics to damp out any high frequency currents produced by the discharge across said gap, an indicator in said path, a high frequency shunt path connected across said leads, comprising a condenser and resistor in series, said condenser comprising a high pass filter to discriminate against the low frequencies produced by said discharge and cooperating with the breakdown path of said utility to form a high frequency circuit in which a high frequency current is produced in response to a discharge across said breakdown path, and an indicator connected across said resistor and adapted to be energized by the voltage drop thereacross produced by passage of said high frequency current, whereby flashing of said last indicator indicates a breakdown in said utility and flashing of said first indicator indicates normal line conditions.

5. An electrical testing apparatus for testing the electrical characteristics of a utility having a breakdown path comprising leads to be connected to the utility to be tested, a source of alternating voltage connected across said leads to supply testing voltage thereto, a shunt discharge path connected across said leads having a gap adapted to break down and pass current when subjected to said testing voltage, said path having impedance characteristics to damp out any high frequency currents produced by the discharge across said gap, a high frequency shunt path connected across said leads having high pass filter means to discriminate against the low frequencies produced by said gap discharge, said shunt path cooperating with the breakdown path of said utility to form a high frequency circuit in which high frequency oscillations are produced by a discharge across said breakdown path, and glow lamps connected in said shunt discharge path and in said high frequency shunt path to indicate passage of current in the respective paths.

ALEXANDER C. WALL.

REFERENCES CITED

The following references are of record in the file of this patent:

UNITED STATES PATENTS

| Number | Name | Date |
|---|---|---|
| 1,210,566 | Vahey | Jan. 2, 1917 |
| 1,253,211 | Chubb | Jan. 15, 1918 |
| 1,257,651 | Tallman et al. | Feb. 26, 1918 |
| 1,950,484 | Clarvoe | Mar. 13, 1934 |
| 2,087,783 | Savage | July 20, 1937 |
| 2,157,929 | Troger | May 9, 1939 |
| 2,282,261 | Steegstra | May 5, 1942 |